US 9,342,255 B2

(12) United States Patent
Jayaraman et al.

(10) Patent No.: US 9,342,255 B2
(45) Date of Patent: *May 17, 2016

(54) TRANSFER SIZE MONITOR, DETERMINATION, AND OPTIMIZATION ENGINE FOR STORAGE DEVICES

(71) Applicant: International Business Machines Corporation, Armonk, NY (US)

(72) Inventors: Prasanna Jayaraman, Bangalore (IN); Abhijit Saurabh, Bihar (IN); M. Dean Sciacca, Poughkeepsie, NY (US); Janani Swaminathan, Chennai (IN); Gary A. Tressler, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/301,185

(22) Filed: Jun. 10, 2014

(65) Prior Publication Data
US 2015/0355847 A1    Dec. 10, 2015

(51) Int. Cl.
G06F 3/06    (2006.01)

(52) U.S. Cl.
CPC .............. *G06F 3/0646* (2013.01); *G06F 3/064* (2013.01); *G06F 3/0613* (2013.01); *G06F 3/0634* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| 6,557,055 | B1 * | 4/2003 | Wiese | G06F 13/385 710/17 |
| 7,181,588 | B2 * | 2/2007 | Johnson | G06F 12/08 711/153 |
| 8,151,020 | B2 | 4/2012 | Merry, Jr. et al. | |
| 8,547,996 | B2 | 10/2013 | Deutesfeld | |
| 2004/0236924 | A1 * | 11/2004 | Johnson | G06F 12/08 711/173 |
| 2006/0143379 | A1 | 6/2006 | Khan et al. | |
| 2007/0180328 | A1 * | 8/2007 | Cornwell | G06F 11/073 714/42 |

(Continued)

OTHER PUBLICATIONS

IBM: List of IBM Patents or Patent Applications Treated as Related (Appendix P).

(Continued)

*Primary Examiner* — Adam M Queler
*Assistant Examiner* — Dustin Bone
(74) *Attorney, Agent, or Firm* — Teddi E. Maranzano; Robert Williams

(57) ABSTRACT

A method of monitoring, optimizing, and dynamically varying transfer size in a storage device is provided, including: receiving data transfer parameters for a Solid State Disk (SSD) device; selecting a data transfer size from the disk characterization data associated with the SSD device, based on a SSD device identifier in the received data transfer parameters matching the SSD device identifier in the disk characterization data; searching a weight-age table for a process identifier (PID) matching the PID from the received data transfer parameters; determining a heuristic representing a statistical distribution of Input/Output (I/O) operations per second (IOPS) and transfer sizes over time; modifying the received data transfer parameters based on at least one of: the selected data transfer size from the disk characterization data; the weight-age table; and the heuristic; and completing one or more (I/O) operations with the SSD device using the modified data transfer parameters.

14 Claims, 8 Drawing Sheets

(56) References Cited

U.S. PATENT DOCUMENTS

| | | |
|---|---|---|
| 2008/0120441 A1 | 5/2008 | Loewenstein |
| 2011/0004722 A1* | 1/2011 | Jeddeloh ............... G06F 12/00 711/103 |
| 2011/0167239 A1* | 7/2011 | Horn ............... G06F 17/30129 711/170 |
| 2012/0239859 A1 | 9/2012 | Lary et al. |
| 2013/0282954 A1* | 10/2013 | Sankar ............... G06F 3/061 711/103 |
| 2014/0310443 A1 | 10/2014 | Herbeck |
| 2015/0006785 A1* | 1/2015 | Jayaraman ............ G06F 3/0611 711/103 |

OTHER PUBLICATIONS

U.S. Appl. No. 13/929,904, entitled: "Dynamically Varying Transfer Size in a Storage Device for Improved Performance", filed Jun. 28, 2013.

U.S. Appl. No. 14/520,402, entitled: "Transfer Size Monitor, Determination, and Optimization Engine for Storage Devices", filed Oct. 22, 2014.

* cited by examiner

US 9,342,255 B2

TRANSFER SIZE MONITOR, DETERMINATION, AND OPTIMIZATION ENGINE FOR STORAGE DEVICES

FIELD OF INVENTION

The present disclosure relates generally to the field of computer systems, and more particularly, to improving performance in solid state disk devices.

BACKGROUND

Solid State Disk (SSD) devices generally demonstrate advantages over Hard Disk Drives (HDD) because they are based on a semiconductor memory technology rather than on rotating mechanical media as in HDDs. SSDs generally exhibit lower latencies and faster response times. These characteristics offer higher throughput, especially for enterprise workloads such as data analytics that are Input/Output (I/O) intensive. Applications and operating systems may have some awareness of the characteristics of the data in I/O operations, and may be able to estimate through trial and error which set of data transfer parameters may improve throughput. However, optimizing disk performance in, for example, SSDs typically is a reactive and re-iterative process that is based on historical measurements. Therefore, throughput may be improved by proactively optimizing disk performance.

BRIEF SUMMARY

According to an aspect of the invention, a method of monitoring, optimizing, and dynamically varying transfer size in a storage device may include: receiving data transfer parameters for a Solid State Disk (SSD) device using a program, the program being executable by a processor of a computer; selecting a data transfer size from the disk characterization data associated with the SSD device, based on a SSD device identifier in the received data transfer parameters matching the SSD device identifier in the disk characterization data; searching a weight-age table for a process identifier (PID) matching the PID from the received data transfer parameters; determining a heuristic representing a statistical distribution of Input/Output (I/O) operations per second (IOPS) and transfer sizes over time; modifying the received data transfer parameters based on at least one of: the selected data transfer size from the disk characterization data; the weight-age table; and the heuristic; and completing one or more (I/O) operations with the SSD device using the modified data transfer parameters.

In another aspect of the invention, a computer program product for monitoring, optimizing, and dynamically varying transfer size in a storage device may be provided. The computer program product may include a Transfer Size Monitor Determination and Optimization Engine (TSMDOE) embodied on a computer readable storage medium, the TSMDOE including code executable by a processor to perform a method. The method may include: receiving data transfer parameters for a Solid State Disk (SSD) device using a program, the program being executable by a processor of a computer; selecting a data transfer size from the disk characterization data associated with the SSD device, based on a SSD device identifier in the received data transfer parameters matching the SSD device identifier in the disk characterization data; searching a weight-age table for a process identifier (PID) matching the PID from the received data transfer parameters; determining a heuristic representing a statistical distribution of Input/Output (I/O) operations per second (IOPS) and transfer sizes over time; modifying the received data transfer parameters based on at least one of: the selected data transfer size from the disk characterization data; the weight-age table; and the heuristic; and completing one or more (I/O) operations with the SSD device using the modified data transfer parameters.

In another aspect, a computer system for monitoring, optimizing, and dynamically varying transfer size in a storage device may be provided. The computer system may provide one or more processors, one or more computer-readable storage devices, and a plurality of program instructions stored on at least one of the one or more storage devices for execution by at least one of the one or more processors. The plurality of program instructions may include: receiving data transfer parameters for a Solid State Disk (SSD) device using a program, the program being executable by a processor of a computer; selecting a data transfer size from the disk characterization data associated with the SSD device, based on a SSD device identifier in the received data transfer parameters matching the SSD device identifier in the disk characterization data; searching a weight-age table for a process identifier (PID) matching the PID from the received data transfer parameters; determining a heuristic representing a statistical distribution of Input/Output (I/O) operations per second (IOPS) and transfer sizes over time; modifying the received data transfer parameters based on at least one of: the selected data transfer size from the disk characterization data; the weight-age table; and the heuristic; and completing one or more (I/O) operations with the SSD device using the modified data transfer parameters.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
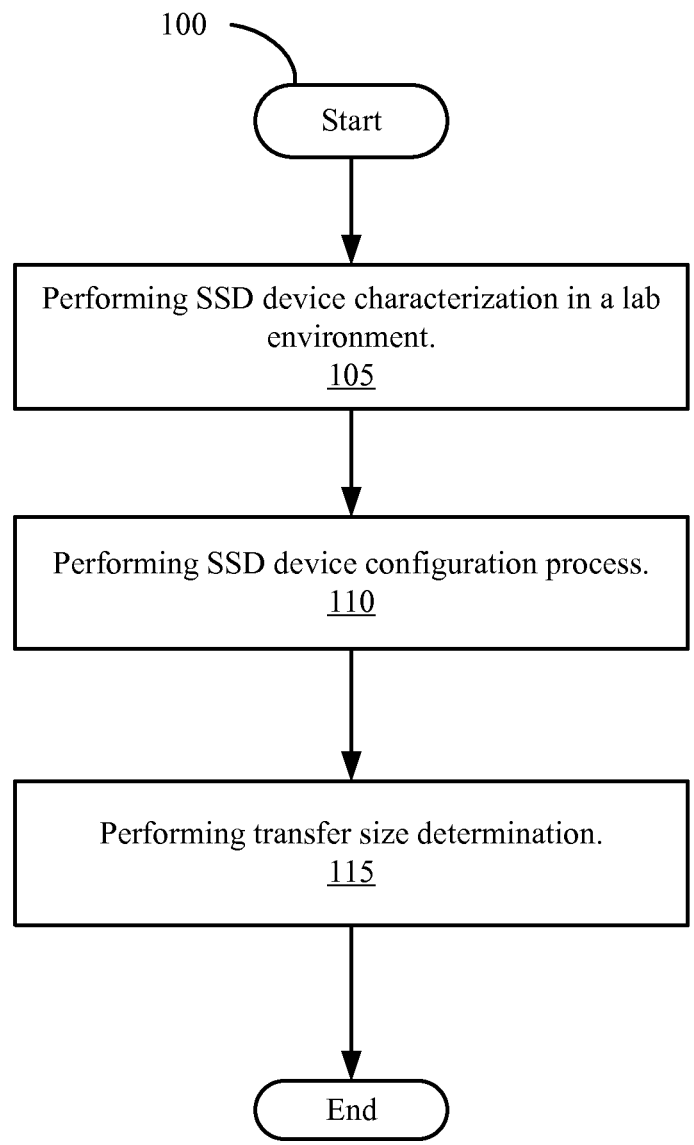
FIG. 1 is a flow chart illustrating an overview of an exemplary embodiment of a method of dynamically varying transfer size in a storage device.
Figure 6:
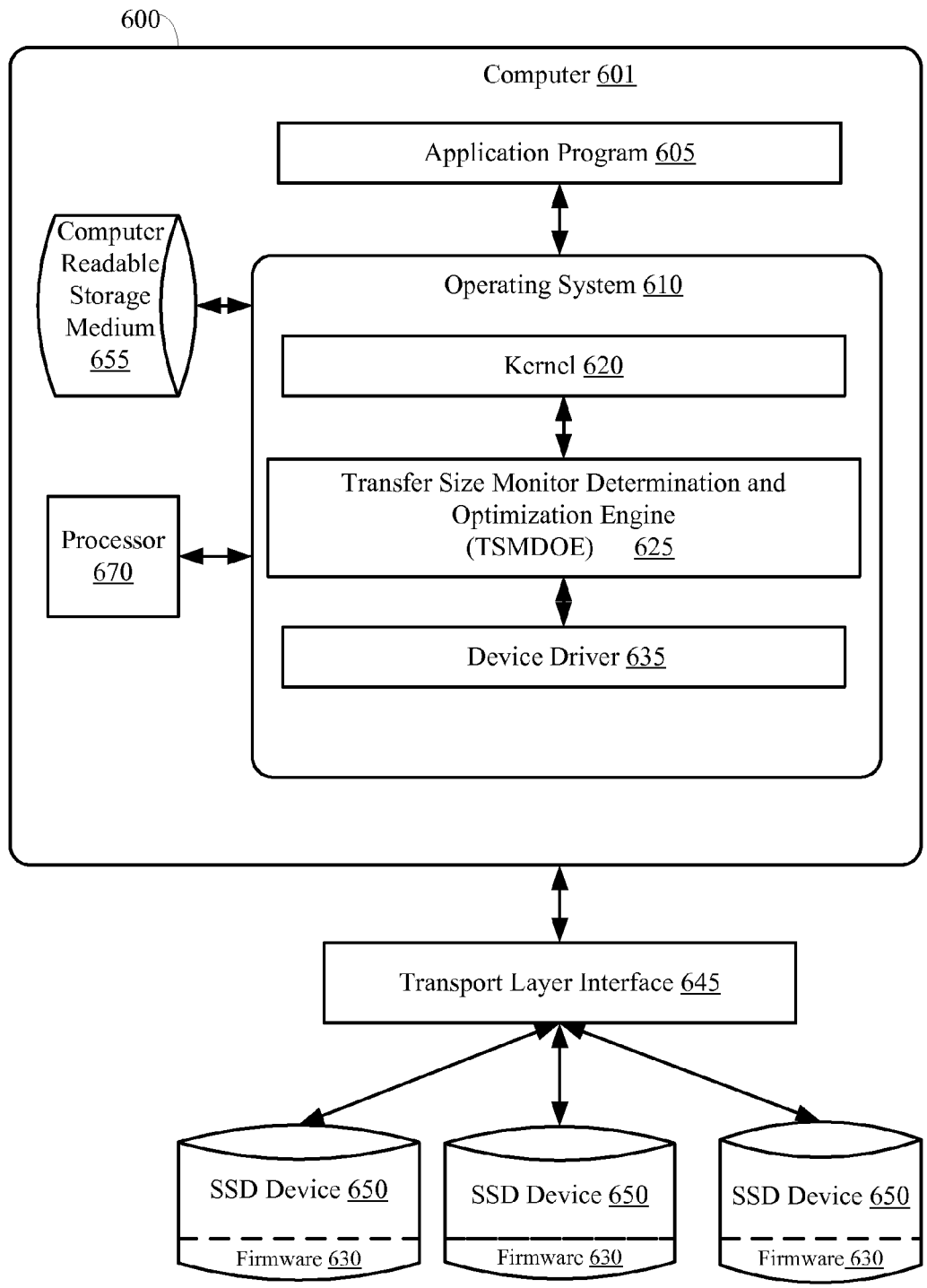
FIG. 6 is a schematic block diagram of a computing software environment utilizing the embodiments of FIGS. 1-4.

Referring to FIGS. 1 and 6, according to an embodiment of the disclosure, a method 100 and system 600 analyze and may improve data transfer performance when using storage media such as Solid State Disk (SSD) devices.

As depicted in FIG. 6, the system 600 may include a computer 601, one or more processors 670, and a plurality of SSD devices 650 communicating with the computer 601 through a Transport Layer Interface (TLI) 645 protocol, such as Fibre Channel. The plurality of SSD devices 650 each include firmware 630, which may act as a control program for each respective device. The computer 601 may further include an application program 605 which may be stored on the computer readable storage medium 655, and which may execute on the one or more processors 670. Within the computer 601, an operating system 610 includes specialized instructions for the management of the hardware and software components of the computer 601 such as, for example, those of the computer environment shown as 700 in FIG. 7. The kernel 620 component of the operating system 610 includes management of the low-level communications between the hardware and software components, also called the abstraction layer. The kernel 620 may also contain other operating system 610 subcomponents, such as a device table (not shown) which defines the devices connected to the computer 601 and their characteristics. The operating system 610 may further consist of one or more device drivers 635, each of which may be installed to control a particular type of device, such as the plurality of SSD devices 650 that are attached to the computer 601. Other software programs may be installed in the computer 601 that may supplement and extend the functionality of the operating system 610. For example, a Transfer Size Monitor Determination and Optimization Engine (TSMDOE) 625 may analyze and optimize the I/O requests between another software layer, such as the application program 605, and a device such as a SSD device 650. The TSMDOE 625 may be supplied in one of several platform-dependent formats, such as, for example, a package in Linux, and may be installed using standard operating system specific procedures, such as RPM, the Linux software install program.

Referring now to FIG. 1, 105 represents the start of the method 100. As discussed in FIG. 2 below, the SSD device 650 (FIG. 6) may undergo analytical characterization in a lab environment to determine its performance metrics, 105. At 110, and further discussed in FIG. 3 below, the operating system 610 (FIG. 6) configures the SSD device 650 (FIG. 6) for use by the computer 601 (FIG. 6). At 115, the TSMDOE 625 (FIG. 6), as further discussed in FIG. 4 below, may intercept and optimize one or more data transfer requests to the SSD device 650 (FIG. 6).

Figure 2:
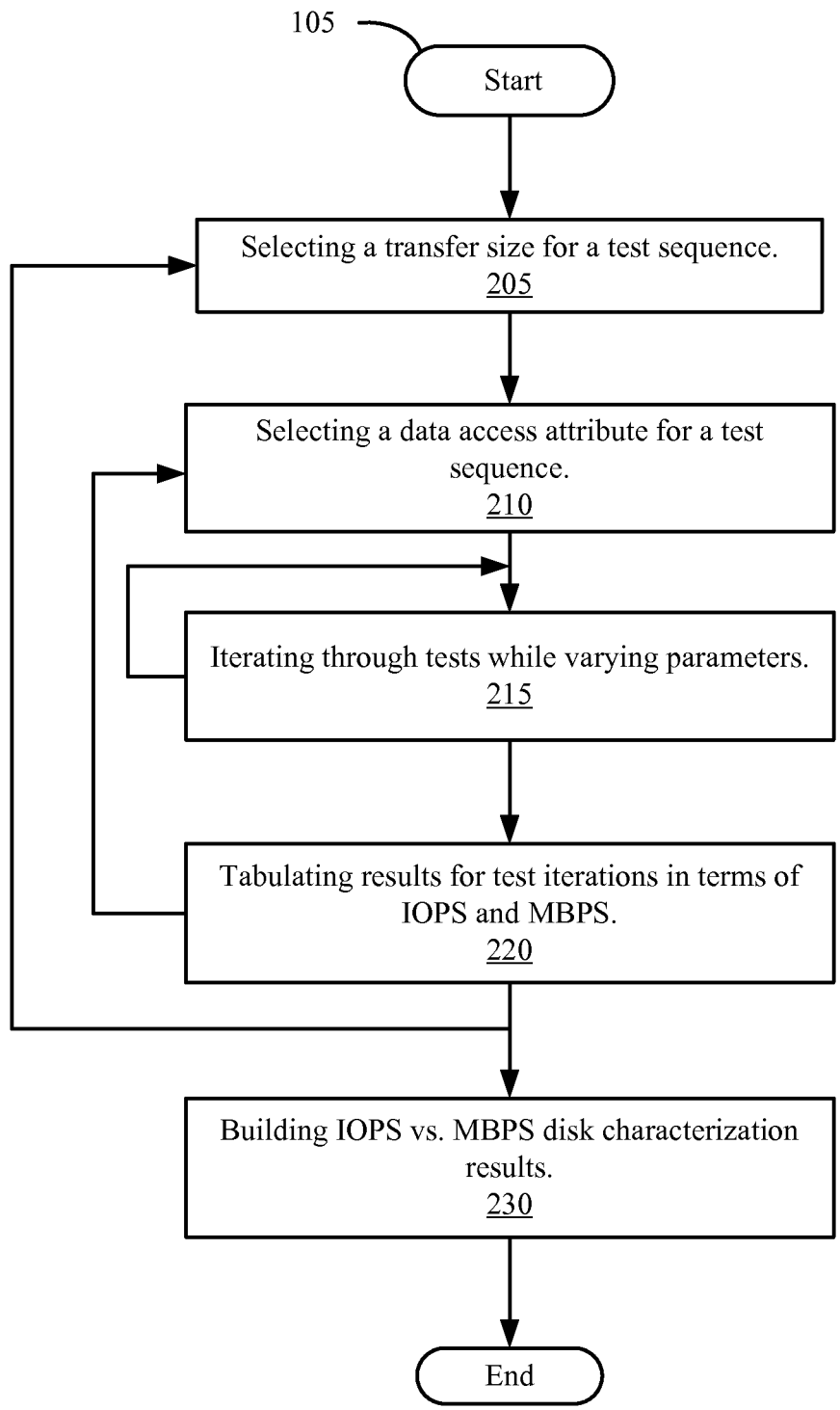
FIG. 2 is a flow chart illustrating an exemplary embodiment of a method of using a variety of workloads to analyze the performance metrics of a SSD device.

Referring now to FIG. 2, a method 105 of using a variety of workloads to perform device characterization in a lab environment is illustrated. The SSD device 650 (FIG. 6) may be connected to a computer that is designed and configured to test the performance metrics (i.e., device characterization) of the SSD device 650 (FIG. 6). A predetermined workload executes to determine and collect a plurality of performance metrics describing the SSD device 650 (FIG. 6). In designing the workload, the SSD device 650 (FIG. 6) may be isolated from the underlying computer platform, including other hardware or software components, so that the SSD device 650 (FIG. 6) is the only limiting variable in the test. For example, the underlying computer platform may contain only the software program containing the workload, and have connected to it only the SSD device 650 (FIG. 6) being tested. The workload may consist of one or more industry-standard performance test suites, such as a latency test, a throughput test, or a write saturation test. In another embodiment, the workload may incorporate feedback data that the TSMDOE 625 (FIG. 6) may collect during customer operation. For example, the TSMDOE 625 (FIG. 6) may determine that the observed performance metrics are not comparable against the disk characterization data produced from the previous workload. In that case, the TSMDOE 625 (FIG. 6) may be configured to transfer the observed performance metrics to vendor of the SSD device 650 (FIG. 6), for example, by a secured network connection. Thus, the accuracy of the disk characterization data may be continuously improved.

The following discussion of exemplary performance metrics is presented as an illustration of, and not a limitation on, possible data that a disk characterization workload may be designed to capture.

Latency, which is one exemplary SSD device performance metric, represents an average of the time required to complete a predetermined profile of read commands, write commands, or a mixture of both. Latency may vary depending upon, among other factors, the size of the data (e.g., 4 kilobytes (KB) or 256 KB) and the degree of randomness of the data access. The mixture of read commands versus write commands in a workload may likewise affect SSD latency.

Data entropy, which is another exemplary metric in SSD performance, may be described as the randomness exhibited by the data, itself, and may be further described in terms of compressibility of the data. Purely random data, such as video, may not be compressible because the randomness does not follow a probability distribution that compression algorithms may model. Similarly, data that is already compressed, as well as encrypted data, have the redundancy patterns removed, rendering these two data types incompressible. In summary, the lower the entropy, the more redundant and compressible the data. However, the higher the entropy, the less redundant and compressible the data.

Queue depth is another exemplary performance metric that may be included in the disk characterization workload. Queue depth generally may be referred to as a number of Input/Output (I/O) operations queued to a disk drive. Increasing queue depth may improve I/O throughput performance. However, an increase in latency may result as a trade-off.

Write amplification is an exemplary metric that occurs where, due to the architectural characteristics of SSD technology, the physical amount of data written exceeds the logical I/O request. Generally, the flash storage component of a SSD is constructed in pages, such as 8 KB, that are organized in blocks of, for example 256 KB. In SSD technology, data is not directly overwritten, but is only marked for later deletion, an operation that occurs at the block level. Therefore, over time, data in a file may become increasingly fragmented and spread over several blocks. To support the I/O profile of an application, it may be necessary to relocate data within the blocks. The process includes mapping and updating the location of the data within the blocks, then erasing the affected blocks. Therefore, an I/O request to write 4 KB of data may result in movement of up to an entire 256 KB block, resulting in a write amplification factor of 64 to 1 (256 KB/4 KB).

At 205, a transfer size for a test sequence may be selected. For example, the SSD device 650 (FIG. 6) may be purged and preconditioned prior to beginning a test sequence of a given selected transfer size, such as, for example, 4 KB. Initially, a new and previously unused SSD device may exhibit a period of elevated performance because all blocks are equally available, and random updates and deletions have yet to contribute to fragmentation. However, following the completion of a test sequence, a purge process advantageously returns the SSD device 650 (FIG. 6) to its original state, effectively erasing the existing data. During preconditioning, an initial workload may be executed on the SSD device 650 (FIG. 6) to set any prerequisite conditions, such as strategically placing a number of files on the device, for the next test sequence.

At 210, a data access attribute, such as sequential or random may be selected for a particular test sequence. In sequential access, the workload may consist predominantly of reading blocks of data based on their physical order on the device. Sequential access may also include reading blocks of data in sequential order of a value, such as a key. In that case, while the data may be logically ordered by a value, all the blocks of physical data may not necessarily be in order. In random access, the workload may request blocks of data in no predictable order. At 215, the test sequence may iterate for each of a plurality of parameters such as, for example, entropy, read/write percentage, queue depth, and compressibility of the data. When at 220 the test iterations over the plurality of parameters are complete for the given transfer size (205), a table of results representing I/O Operations per Second (IOPS), and Megabits per Second (Mb/s) is created for the transfer size, data access attributes, and plurality of parameters input to the disk characterization process. The sequence 205, 210, 215, and 220 may repeat for each transfer size selected at 205.

Figure 5:
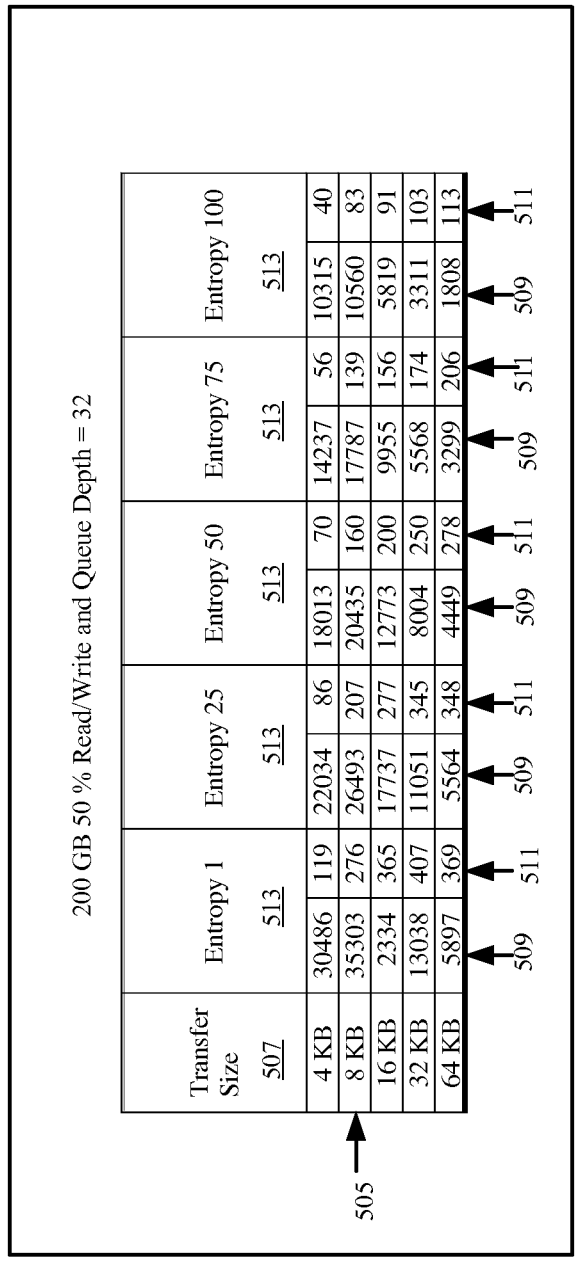
FIG. 5 is a table illustrating a sampling of disk characterization data used in determining a preferred data transfer size, according to one exemplary embodiment.

Following the completion of the test sequences for each of the transfer sizes, at 230 the resulting performance metrics of the SSD device 650 (FIG. 6) are aggregated as disk characterization data. For example, FIG. 5 shows exemplary disk characterization data for a 200 Gigabyte (GB) SSD device 650 (FIG. 6), formatted as a table to facilitate viewing the data. As shown in FIG. 5, the input test parameters include a 50% ratio of read to write operations, a queue depth of "32" pending I/O operations, and a variety of entropies 513 for each of a range of transfer sizes 507. The IOPSs 509 and Mb/s 511 represent the calculated throughput values for the various combinations of parameters and transfer sizes that were tested. The disk characterization data may be supplied on the SSD device 650 (FIG. 6) as firmware 630 (FIG. 6), or as separate software that may be installed by the operating system 610 (FIG. 6). In another embodiment, the exemplary disk characterization method 105 (FIG. 2) may constitute a part of a vendor's ongoing product maintenance schedule. Product maintenance that includes disk characterization data may be supplied as updates to the firmware 630 (FIG. 6), the device driver 635 (FIG. 6), or the operating system 610 (FIG. 6). As part of applying the product maintenance, the operating system 610 (FIG. 6) may dynamically update its existing copy of the disk characterization data, as kept in operating system 610 (FIG. 6) memory, thereby keeping a SSD device 650 (FIG. 6) that is in service on a computer 601 (FIG. 6) current without a service interruption.

Figure 3:
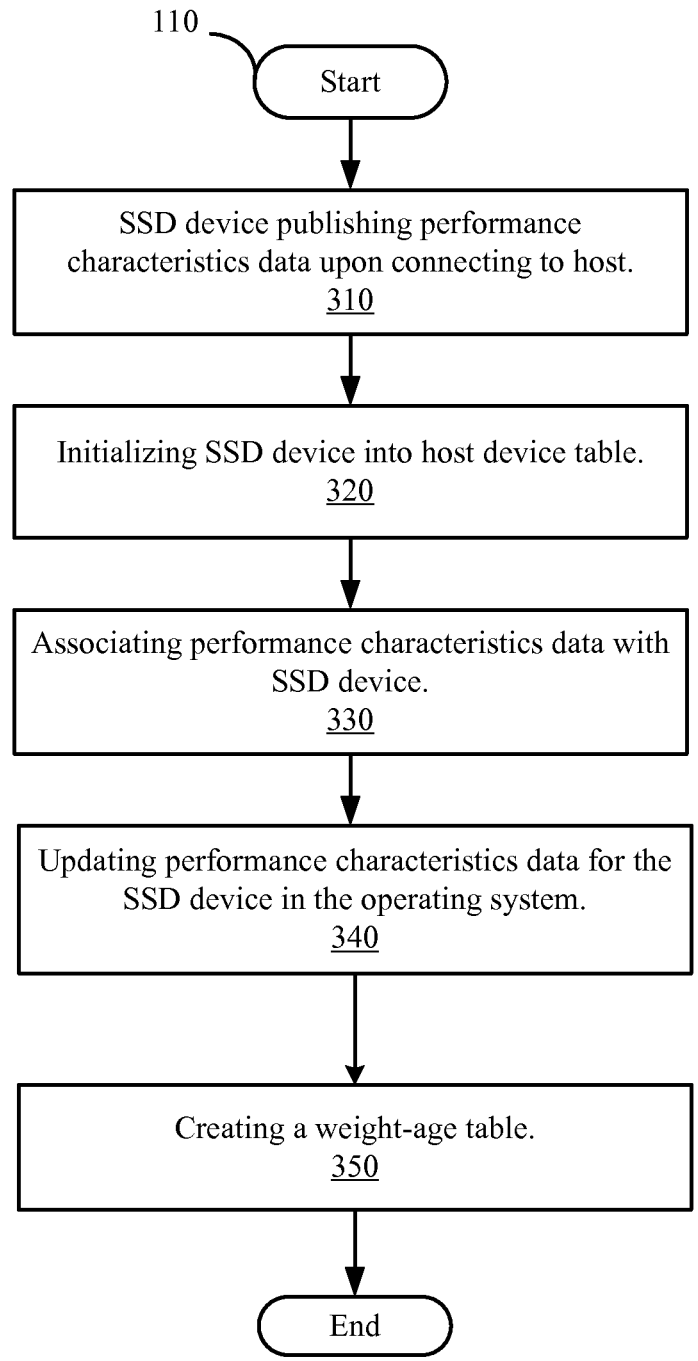
FIG. 3 is a flow chart illustrating an exemplary embodiment of a method of adding the disk characterization data developed in FIG. 2 to a computer when installing a SSD device.

Referring now to FIG. 3, a method 110 is illustrated for adding the disk characterization data to the computer 601 (FIG. 6) when the SSD device 650 (FIG. 6) is installed. In general, when a device is initially connected to a computer, the operating system uses specialized program instructions to add the device to a table of devices known to the operating system. In operation, at 310 when the SSD device 650 (FIG. 6) is first connected to the computer 601 (FIG. 6), the SSD device 650 (FIG. 6) reports its identifying characteristics to the operating system 610 (FIG. 6). Identifying characteristics may include for example, a device type, a vendor identifier, a product identifier, a serial number, a capacity (i.e., in GB of data), associated device driver software, and a list of commands and other functions known to the device. At 320, the operating system 610 (FIG. 6) invokes a platform-specific configuration method to generate a unique device identifier for the SSD device 650 (FIG. 6), and to build an entry for the SSD device 650 (FIG. 6) in the operating system 610 (FIG. 6) device table which may reside in, for example, a storage medium 655 (FIG. 6) or operating system 610 (FIG. 6) memory. As part of the device configuration process, the operating system 610 (FIG. 6) installs the disk characterization data associated with the SSD device 650 (FIG. 6) to a location accessible to the TSMDOE 625 (FIG. 6), for example in a memory location or a storage medium 655 (FIG. 6). At 330, the disk characterization data entries for all the SSD devices 650 (FIG. 6) may be organized for efficient access as a database, an array, a linked list, or in another format suitable for storing similar types of data. Thus, the TSMDOE 625 (FIG. 6) may process simultaneous data transfer requests for a plurality of SSD devices 650 (FIG. 6).

In addition to a predetermined workload, the disk characterization process described above in FIG. 2 may incorporate feedback data that the TSMDOE 625 (FIG. 6) may collect during customer operation, especially where the TSMDOE 625 (FIG. 6) determines that the observed performance metrics are not comparable against the disk characterization data produced from the previous workload. This may occur, for example, where no disk characterization data was supplied with an installed SSD device 650 (FIG. 6), or where a lack of granularity in the disk characterization data resulted in the TSMDOE 625 (FIG. 6) frequently choosing default values. At 340, a vendor may supply updated disk characterization data throughout the lifecycle of the SSD device 650 (FIG. 6). An administrator of the computer system may install the updates using a platform-specific procedure similar to that used when adding maintenance to an operating system. Upon installation, the operating system 610 (FIG. 6) dynamically updates its existing copy of disk characterization data, making the updated version promptly available to the TSMDOE 625 (FIG. 6). Thus, the TSMDOE 625 (FIG. 6) and the computer 601 (FIG. 6) can transparently respond to the latest nuances and features of the SSD device 650 (FIG. 6) with improved transfer size granularity.

Figure 7:
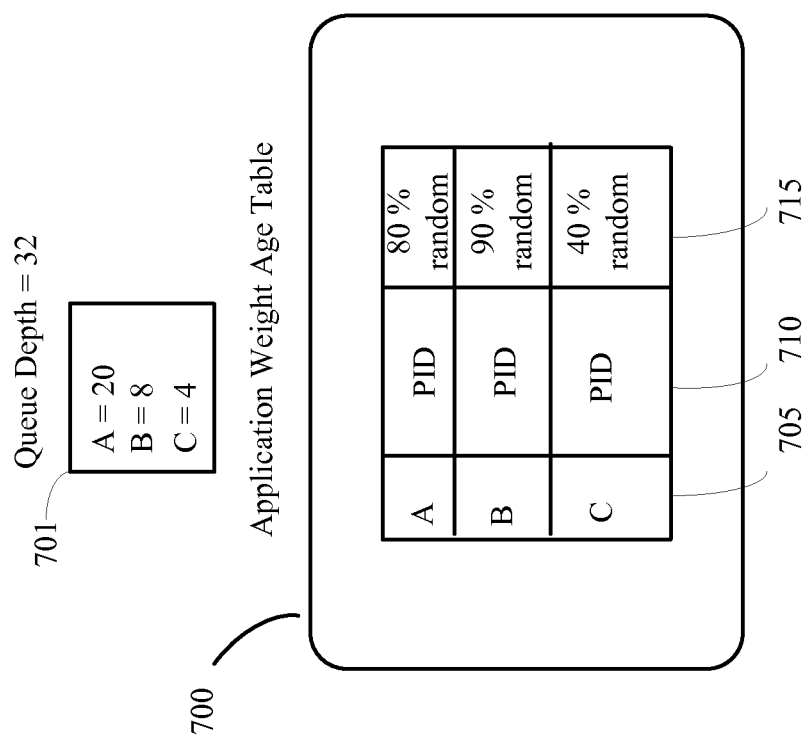
FIG. 7 illustrates an exemplary embodiment of a weight-age table.

An administrator of the computer system may create a weight-age table 700 (FIG. 7) for each registered application, at 350. One skilled in the art may understand that several computer platform dependent approaches may be employed. For example, in a Linux-type operating system, a configuration file may be defined that contains a static value, such as a short name for the application (e.g., SAP), and a path to the primary executable program of the application. Once created, the weight-age table 700 may reside in a location accessible to the TSMDOE 625 (FIG. 6), for example in a memory location or on a storage medium 655 (FIG. 6). As depicted in FIG. 7, the weight-age table 700 includes a corresponding entry for each application 705, and a unique computer-assigned identifier referred to a process identifier (PID) 710. Since the PID 710 is computer-generated, not every application 705 may have an associated PID 710, for example, when the application 705 is not executing. However, a function of the TSMDOE 625 (FIG. 6) may include monitoring the programs executing on the computer. When a program is detected that corresponds to an application 705 in the weight-age table 700, then the PID 710 corresponding to the application 705 may be updated with the current value. The weight-age table 700 also includes a general percentage of at least one parameter 715, such as read/write, entropy, and randomness, which the TSMDOE 625 (FIG. 6) can use for determining transfer size. The parameter 715 values may be determined over time by the TSMDOE 625 (FIG. 6) or by any software that measures performance of the applications and the computer hosting them. Subsequently, the parameter 715 values may be updated programmatically or manually by the administrator of the computer system. However, a good candidate application 705 for weight-age registration is one without a statistical variance in its data transfers.

Figure 4:
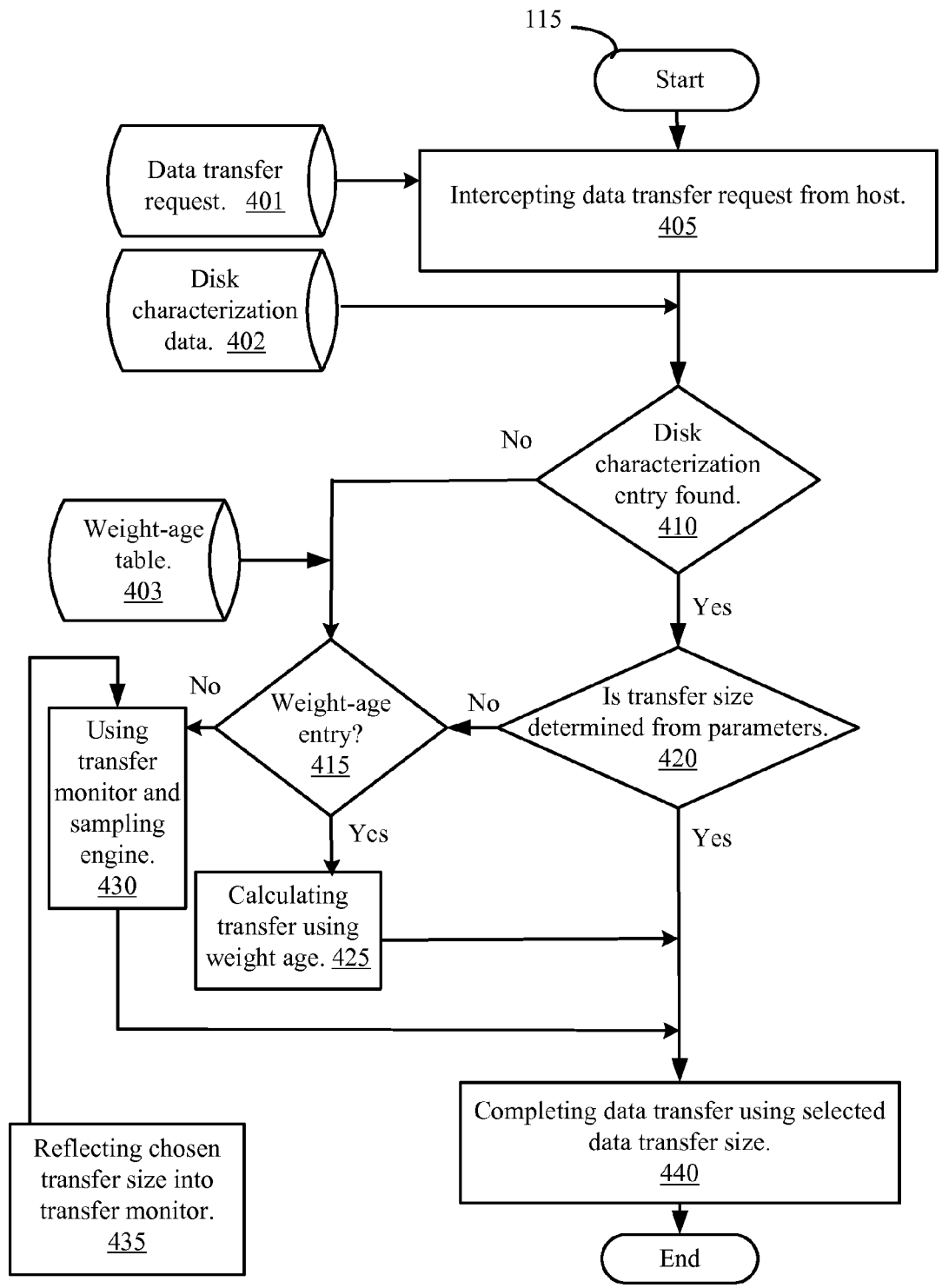
FIG. 4 is a detailed flow chart illustrating a method of determining a preferred data transfer size for improved performance, according to one exemplary embodiment.

Referring now to FIG. 4, a method 115 is illustrated for determining a preferred data transfer size for improved performance. The TSMDOE 625 (FIG. 6) software may be installed using a standard operating system specific program, such as RPM (Linux). Following initialization into memory by the operating system 610 (FIG. 6), the TSMDOE 625 (FIG. 6) accesses the location where the operating system 610 (FIG. 6) installed the disk characterization data (FIG. 5) during the device configuration process of FIG. 3. Alternatively, the TSMDOE 625 (FIG. 6) may access the weight-age table 700 (FIG. 7). When the TSMDOE 625 (FIG. 6) detects that an instance of an application 705 (FIG. 7) is executing, the TSMDOE 625 (FIG. 6) updates the weight-age table 700 (FIG. 7) with its PID 710 (FIG. 7).

At 405, the TSMDOE 625 (FIG. 6) may intercept and parse data transfer requests 401 that originated in various layers in the software stack and identify a SSD device 650 (FIG. 6) as the target. For example, a user application program 605 (FIG. 6) may request to read a 4 KB block of data by specifying the name of the file where the data is stored. The operating system 610 (FIG. 6) may associate the file name and the data transfer request with the SSD device 650 (FIG. 6), then package the data transfer request and its associated parameters into a structure, referred to as a control block (not shown). The associated parameters may include, for example, the seek capability of the data (e.g., random or sequential), the amount of data to transfer, the number of threads processing the data, and the compressibility of the data. A next layer, such as the kernel 620 (FIG. 6), receives the control block and may then add to or modify the parameters in the control block, for example to satisfy parameter passing requirements between component layers. Before reaching the device driver 635 (FIG. 6) for the SSD device 650 (FIG. 6), the TSMDOE 625 (FIG. 6) may intercept the control block and extract parameters that uniquely identify the SSD device 650 (FIG. 6), such as for example, an operating system-generated device identifier, a vendor identifier, a product identifier, and/or a serial number, to search the plurality of disk characterization data entries, as shown in the example of FIG. 5, 402 for an entry associated with the SSD device 650 (FIG. 6).

If at 410 a disk characterization data entry corresponding to the SSD device 650 (FIG. 6) is found, the TSMDOE 625 (FIG. 6) may parse the contents of the control block for parameters describing the data transfer request, such as a transfer size and whether the request is to read or write. The TSMDOE 625 (FIG. 6) may then determine an optimized transfer size 507 (FIG. 5) based on the extracted data transfer parameters and the disk characterization data. For example, the TSMDOE 625 (FIG. 6) may parse the control block and determine that data is to be read from the 200G SSD device having the disk characterization data depicted in FIG. 5. Based on the disk characterization data (FIG. 5), the TSMDOE 625 (FIG. 6) may determine that an 8 KB transfer size 505 (FIG. 5) is likely to provide an optimized throughput in terms of IOPS 509 (FIG. 5) and Mb/s 511 (FIG. 5) in comparison to the 4 KB transfer size originally requested by the application program 605 (FIG. 6). The TSMDOE 625 (FIG. 6) may modify the data transfer request to use the new data transfer value (e.g., 8 KB) and at 440 pass the modified data transfer request (e.g., 8 KB) to the device driver 635 (FIG. 6) for the SSD device 650 (FIG. 6) for completion.

However, an optimized transfer size 507 (FIG. 5) may not immediately be located based only on the extracted data transfer parameters. For example at 410, the disk characterization data (FIG. 5) may be corrupted, no disk characterization data may be provided for the SSD device 650 (FIG. 6), or at 420 one or more parameters may be missing from the data transfer request. The TSMDOE 625 (FIG. 6) may attempt to intelligently substitute a value for the missing parameter based on the available data transfer parameters. Where no substitution is feasible, at 415 the TSMDOE 625 (FIG. 6) may, at 403, access the weight-age table 700. The weight-age table 700 (FIG. 7) is then searched for a PID 710 (FIG. 7) matching the PID of the application program making the data transfer request. For example, using the weight-age table shown in FIG. 7, applications "A", "B", and "C" have data transfer requests 701 on a queue to a SSD device 650 (FIG. 6), having a queue depth of "32". Since application "A" has the largest number of requests on the queue (i.e., queue dominance), the TSMDOE 625 (FIG. 6) may locate the entry for application "A" in the weight-age table 700, and at 425, calculate transfer sizes for random transfers of 80% random access at queue depth of "32" to complete the data transfer 440. In this case, the data transfer request may be modified to use the parameters from the weight-age table, since they have historically proven, over time, to produce the best performance.

At 425, a weight-age entry may not be found that corresponds to the PID of the application program making the data transfer request. For example, the application program may not be registered in the weight-age table 700 (FIG. 7). In that case, the TSMDOE 625 (FIG. 6) may substitute a transfer size, based on historical sampled performance metrics gathered by monitoring and sampling the IOPS over time, 430, and complete the data transfer 440. This confidence index approach represents a measure of the probability that the best transfer size will be accessed over the most number of transfer requests. By monitoring IOPS for a range of transfer sizes, the monitor and sampling component of the TSMDOE 625 (FIG. 6) may determine a heuristic representing a statistical distribution of IOPS vs. transfer sizes. Accordingly, a transfer size may be estimated based on the heuristic. The chosen transfer size data is reflected into the monitor and sampling component of the TSMDOE 625 (FIG. 6) where the transfer size data may affect future heuristic calculations for optimal transfer sizes 435.

Therefore, the TSMDOE 625 (FIG. 6) may prioritize the approaches taken to determine the optimal data transfer sizes for optimal performance. Initially, having intercepted and parsed a data transfer request, the TSMDOE 625 (FIG. 6) searches the plurality of disk characterization data entries 402, an example of which is shown in FIG. 5, for an entry matching the SSD device identifier in the data transfer request. If a match is not found, the weight-age table may be searched. In this case, the TSMDOE 625 (FIG. 6) searches the weight-age table for a PID matching that of the application program making the data transfer request. If no match is found in the weight-age table, the TSMDOE 625 (FIG. 6) may determine a heuristic. This confidence index approach represents a measure of the probability that the best transfer size will be accessed over the most number of transfer requests.

Figure 8:
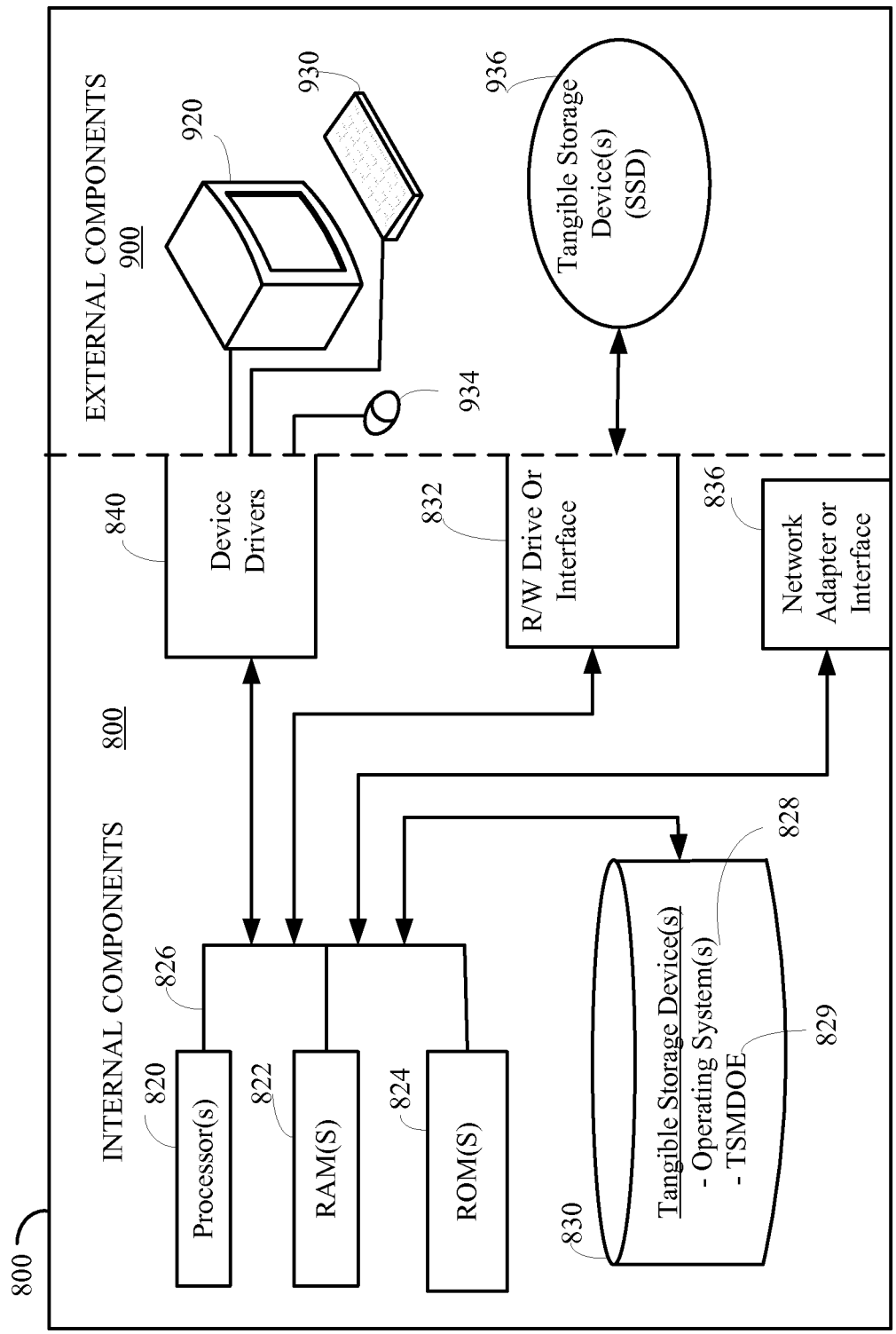
FIG. 8 is a block diagram of hardware and software of the computer environment of FIG. 6 according to an embodiment of the present invention.

Referring now to FIG. 8, computing device 800 may include respective sets of internal component 800 and external components 900. Computer 601 (FIG. 6) may include the respective sets of internal component 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., TSMDOE 829);

and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 800, can be downloaded to computing device 800 from an external computer (e.g., server) via a network (for example, the Internet, a local area network or other, wide area network) and respective network adapters or interfaces 836. From the network adapters (or switch port adaptors) or interfaces 836, the operating system 828 associated with computing device 800 is loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer program product for monitoring, optimizing, and dynamically varying transfer size in a storage device, the computer program product including a Transfer Size Monitor Determination and Optimization Engine (TSMDOE) embodied on a computer readable storage medium, the TSMDOE including code executable by a processor to perform a method comprising:
   receiving data transfer parameters for a Solid State Disk (SSD) device using program, the program being executable by a processor of a computer;
   selecting a data transfer size from a disk characterization data associated with the SSD device, based on a SSD device identifier in the received data transfer parameters matching the SSD device identifier in the disk characterization data;
   searching a weight-age table for a process identifier (PID) matching a PID from the received data transfer parameters;
   determining a heuristic representing a statistical distribution of Input/Output (I/O) operations per second (IOPS) and transfer sizes over time;
   modifying the received data transfer parameters based on at least one of: the selected data transfer size from the disk characterization data; the weight-age table; and the heuristic; and
   completing one or more (I/O) operations with the SSD device using the modified data transfer parameters.

2. The computer program product of claim 1, wherein the searching the weight-age table further comprises:
   extracting the PID from the received data transfer parameters, wherein the extracted PID corresponds to an application making a data transfer request;
   searching the weight-age table for an entry containing a PID matching the extracted PID from the received data transfer parameters; and
   selecting at least one data transfer parameter from the weight-age table entry, based on the PID in the weight-age table matching the extracted PID from the received data transfer parameters.

3. The computer program product of claim 1, wherein the weight-age table comprises at least one of:
   a static value corresponding to an application entry in the weight-age table; and
   an executable program name corresponding to the application entry in the weight-age table;
   the PID corresponding to the application entry in the weight-age table; and
   an entry corresponding to a transfer parameter.

4. The computer program product of claim 3, wherein the transfer parameter comprises one or more of:
   a percentage corresponding to a degree of randomness in data accesses;
   a percentage of data accesses that are read operations;
   a percentage of data accesses that are write operations; and
   a value corresponding to entropy.

5. The computer program product of claim 1, wherein at least one parameter from the weight-age table is selected, based on the at least one parameter not being supplied by the received data transfer parameters; and based on the at least one parameter not being supplied by the disk characterization data.

6. The computer program product of claim 1, further comprising:
   creating a modified data transfer request by merging the at least one data transfer parameter from the weight-age table; the at least one data transfer parameter from the disk characterization data; and the heuristic, based on the received data transfer parameters missing at least one data transfer parameter value.

7. The computer program product of claim 1, wherein a monitoring and sampling component of the TSMDOE samples the modified data transfer requests and maintains a heuristic based on a statistical distribution of TOPS and transfer sizes over time, wherein:
the TSMDOE uses the heuristic to estimate the transfer size; and
a frequency and a duration of time for sampling are configurable.

8. A computer system for monitoring, optimizing, and dynamically varying transfer size in a storage device, the computer system comprising one or more processors, one or more computer-readable storage devices, and a plurality of program instructions stored on at least one of the one or more storage devices for execution by at least one of the one or more processors, the plurality of program instructions comprising:
receiving data transfer parameters for a Solid State Disk (SSD) device using a program, the program being executable by a processor of a computer;
selecting a data transfer size from a disk characterization data associated with the SSD device, based on a SSD device identifier in the received data transfer parameters matching the SSD device identifier in the disk characterization data;
searching a weight-age table for a process identifier (PID) matching a PID from the received data transfer parameters;
determining a heuristic representing a statistical distribution of Input/Output (I/O) operations per second (IOPS) and transfer sizes over time;
modifying the received data transfer parameters based on at least one of: the selected data transfer size from the disk characterization data; the weight-age table; and the heuristic; and
completing one or more (I/O) operations with the SSD device using the modified data transfer parameters.

9. The computer system of claim 8, wherein the searching the weight-age table further comprises:
extracting the PID from the received data transfer parameters, wherein the extracted PID corresponds to an application making a data transfer request;
searching the weight-age table for an entry containing a PID matching the extracted PID from the received data transfer parameters; and
selecting at least one data transfer parameter from the weight-age table entry, based on the PID in the weight-age table matching the extracted PID from the received data transfer parameters.

10. The computer system of claim 8, wherein the weight-age table comprises at least one of:
a static value corresponding to an application entry in the weight-age table; and
an executable program name corresponding to the application entry in the weight-age table;
the PID corresponding to the application entry in the weight-age table; and
an entry corresponding to a transfer parameter.

11. The computer system of claim 10, wherein the transfer parameter comprises one or more of:
a percentage corresponding to a degree of randomness in data accesses;
a percentage of data accesses that are read operations;
a percentage of data accesses that are write operations; and
a value corresponding to entropy.

12. The computer system of claim 8, wherein at least one parameter from the weight-age table is selected, based on the at least one parameter not being supplied by the received data transfer parameters; and based on the at least one parameter not being supplied by the disk characterization data.

13. The computer system of claim 8, further comprising:
creating a modified data transfer request by merging the at least one data transfer parameter from the weight-age table; the at least one data transfer parameter from the disk characterization data; and the heuristic, based on the received data transfer parameters missing at least one data transfer parameter value.

14. The computer system product of claim 8, wherein a monitoring and sampling component of the TSMDOE samples the modified data transfer requests and maintains a heuristic based on a statistical distribution of TOPS and transfer sizes over time, wherein:
the TSMDOE uses the heuristic to estimate the transfer size; and
a frequency and a duration of time for sampling are configurable.

* * * * *